W. L. MANN.
MEANS FOR STERILIZING DRINKING CUPS AND THE LIKE.
APPLICATION FILED NOV. 30, 1917.
1,290,767.
Patented Jan. 7, 1919.
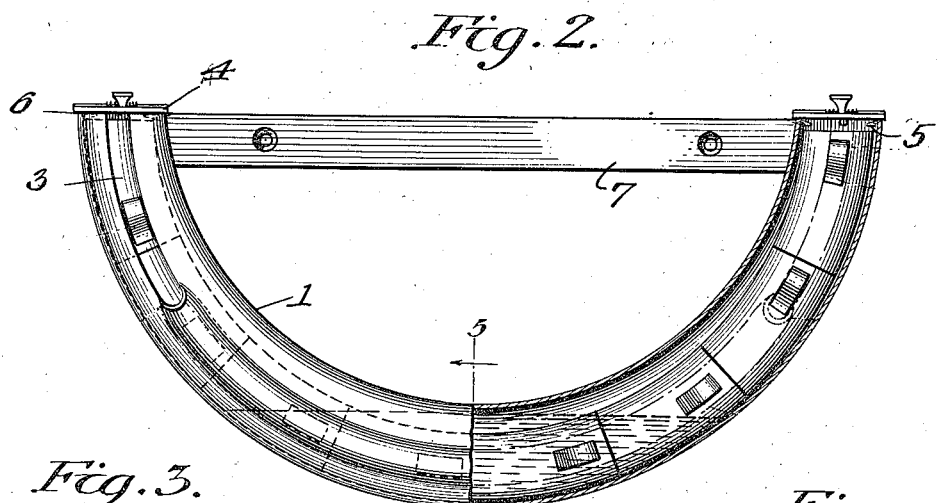
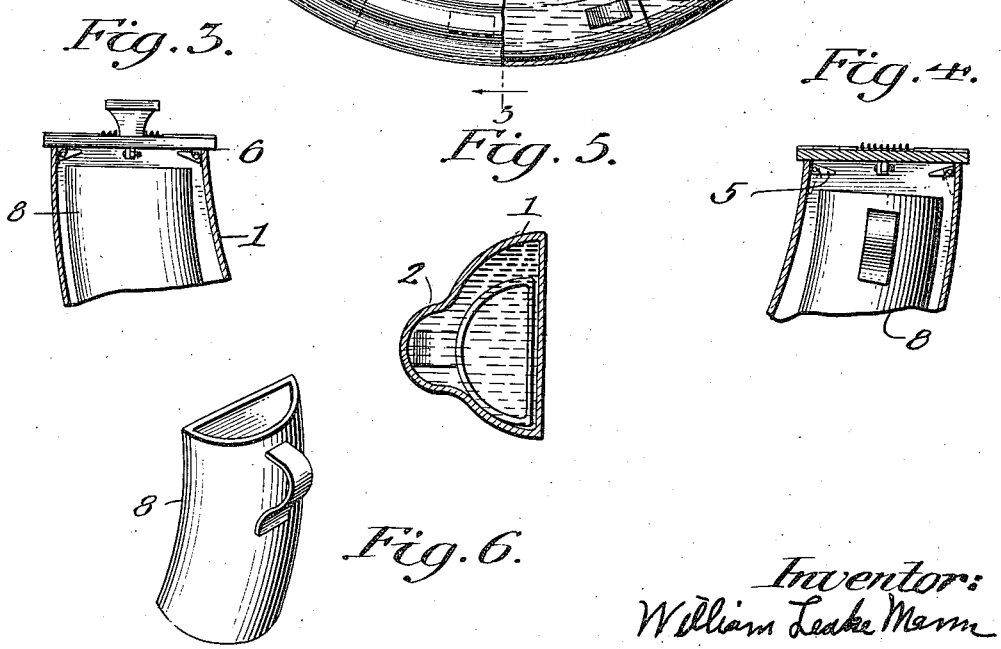
Inventor:
William Leake Mann

UNITED STATES PATENT OFFICE.

WILLIAM LEAKE MANN, OF THE UNITED STATES NAVY.

MEANS FOR STERILIZING DRINKING-CUPS AND THE LIKE.

1,290,767.  Specification of Letters Patent.  Patented Jan. 7, 1919.

Application filed November 30, 1917. Serial No. 204,604.

*To all whom it may concern:*

Be it known that I, WILLIAM LEAKE MANN, a citizen of the United States, in the United States Navy, now stationed at Quantico, in the county of Prince William and State of Virginia, have invented a new and useful Means for Sterilizing Drinking-Cups and the like.

My invention relates to a receptacle for the sterilization of cups, glasses, and other articles in which the entrance and exit is at a higher level than the substance producing sterilization and in which the articles to be sterilized are successfully moved through the sterilizing substance.

In the accompanying drawings Figure 1 is a plan view of the sterilizer. Fig. 2 is a side elevation, the right half being in section. Figs. 3 and 4 are detail views respectively of the exit and receiving ends of the sterilizer. Fig. 5 is a view on the section line 5—5 of Fig. 2, and Fig. 6 is a detail of one of the receptacles or cups preferred.

The device as shown comprises a casing I of tubular form curved approximately to a half circle, the tube being asymmetrical in cross section, as shown in Fig. 5, being flattened on one side as shown and having a projecting rib 2 from its opposite side, such rib being cut away for a distance from each end of the casing, providing an opening or slot 3 for the receptacle handles to project through. The casing is provided with spring closures 4 at its ends, held in closed positions. Locking catches 5 and 6 are also arranged within the ends of the casing to prevent reverse movement of the cups, the catches 5 at the entrance yielding to permit the insertion of the receptacle, but preventing its removal, while the catches 6 at the exit permit the removal of the receptacle but lock to prevent the insertion, the progression of the receptacles through the casing is thus ordered, insuring the passage of the receptacle through the sterilizing or disinfecting solution after use by one individual before such receptacle can be used again, thereby preventing any infection. A reinforcing bar 7 providing means for attachment to any suitable support extends between the ends of the casing, strengthening the same and providing means whereby it may be supported.

The receptacles or cups 8 are flattened on one side to fit the casing and are also curved on the radius of the curve of the casing. The receptacles are provided with handles which project through the slots or openings in the casing and provide means whereby the receptacles may be removed.

The casing is arranged to be held in a position with the ends in the same horizontal plane, and when so held is to have its lower portion filled with a disinfectant or sterilizing solution through which the receptacles are passed as they proceed from the entrance to the exit.

Having thus described my invention, I claim:—

1. A sterilizing apparatus comprising a tubular casing having entrance and exit ends and a depending medial portion, said casing being asymmetrical in cross section, and a plurality of receptacles of substantially the same cross section but of a size to permit them to be introduced into the casing and to be passed through a sterilizing substance combined in the medial portion thereof.

2. The combination of a sterilizing apparatus comprising a tubular casing of substantially semi-circular shape, and asymmetrical in cross section, having entrance and exit ends, with a plurality of receptacles of substantially the same cross section but of a size to permit them to be introduced into the casing and to be passed through a sterilizing substance contained in the curve of the casing, and means for ordering the progression of the receptacles through the casing.

3. A sterilizing apparatus comprising a plurality of handled drinking receptacles or cups and a tubular casing curved approximately to a half circle, the tube being flattened on one side and having a projecting rib on the opposite side, said rib being cut away for a distance from each end of the casing, providing a slot or opening for the handles of the contained receptacles to project through, and means for ordering the progression of receptacles or cup through the casing.

4. A sterilizing apparatus for drinking receptacles, comprising a tubular casing curved approximately to a half circle, the tube being flattened on one side and having a projecting rib on the opposite side, said rib being cut away for a distance from each end of the casing, providing an opening to permit access to contained receptacles, means for ordering the progression of the receptacles through the casing, closures for the ends of the casing and a reinforcing bar extending between the ends of the casing.

WILLIAM LEAKE MANN.